(12) United States Patent
Corley et al.

(10) Patent No.: US 10,294,064 B2
(45) Date of Patent: May 21, 2019

(54) CABLE PUSHING DEVICE

(71) Applicants: William Keith Corley, Williamson, GA (US); Lance Paige Toland, Griffin, GA (US)

(72) Inventors: William Keith Corley, Williamson, GA (US); Lance Paige Toland, Griffin, GA (US)

(*) Notice: Subject to any disclaimer, the term of this patent is extended or adjusted under 35 U.S.C. 154(b) by 36 days.

(21) Appl. No.: 15/724,864

(22) Filed: Oct. 4, 2017

(65) Prior Publication Data

US 2019/0100401 A1    Apr. 4, 2019

(51) Int. Cl.
| | |
|---|---|
| *B65H 51/10* | (2006.01) |
| *H02G 1/08* | (2006.01) |
| *B65H 57/12* | (2006.01) |
| *B65H 51/32* | (2006.01) |
| *B65H 51/28* | (2006.01) |

(52) U.S. Cl.
CPC ............ *B65H 51/10* (2013.01); *B65H 51/28* (2013.01); *B65H 51/32* (2013.01); *B65H 57/12* (2013.01); *H02G 1/08* (2013.01)

(58) Field of Classification Search
CPC ........ B65H 51/10; B65H 51/28; B65H 51/32; B65H 57/12; H02G 1/08
USPC ...................... 29/251; 254/134.3 R, 134.3 FT
See application file for complete search history.

(56) References Cited

U.S. PATENT DOCUMENTS

| | | | | |
|---|---|---|---|---|
| 2,316,798 A | * | 4/1943 | Luebbe .................. | B65H 51/10 124/78 |
| 2,603,343 A | * | 7/1952 | Payne .................. | B21D 43/006 198/624 |
| 2,670,926 A | * | 3/1954 | Sewell .................. | B65H 51/10 226/186 |
| 3,310,210 A | * | 3/1967 | Reib ...................... | B29C 47/34 226/1 |
| 3,465,941 A | * | 9/1969 | Gilbert .................. | B65H 51/10 226/177 |
| 3,871,618 A | * | 3/1975 | Funk ...................... | E21B 19/00 226/187 |
| 4,043,494 A | * | 8/1977 | Bickford ................ | B65H 51/10 226/109 |
| 4,899,988 A | * | 2/1990 | Mills ..................... | B65H 51/04 254/134.3 R |
| 6,073,916 A | * | 6/2000 | Plummer ............... | B65H 51/10 226/182 |
| 7,987,570 B2 | * | 8/2011 | Salazar .................. | H02G 1/06 254/134.3 FT |

* cited by examiner

*Primary Examiner* — Michael C McCullough

(57) ABSTRACT

A cable pushing device is an apparatus that efficiently pushes a cable into a pipe with minimal effort. The cable pushing device includes a frame, a first wheel assembly, a second wheel assembly, and a cable guide system. The frame upholds the first wheel assembly, the second wheel assembly, and the cable guide system. The first wheel assembly and the second wheel assembly press against the cable and push the cable into the pipe. The cable guide system positions both the cable and the pipe onto the frame and between the first wheel assembly and the second wheel assembly. The first wheel assembly and the second wheel assembly are aligned with each other such that as the second wheel assembly is rotated by a user, the first wheel assembly applies press onto the cable, opposite the second wheel assembly, and consequently pushes the cable into the pipe.

11 Claims, 9 Drawing Sheets

CABLE PUSHING DEVICE

FIELD OF THE INVENTION

The present invention relates generally to cable pushing devices. More specifically, the present invention is a cable pushing device that simplifies the cable pushing process and accommodates cables and pipes of varying sizes.

BACKGROUND OF THE INVENTION

Cable pushing is a physically taxing and possibly dangerous task that require specialize machinery. These specialized machines typically accommodate specific pipes and cables. In addition to the limited function, the specialized machines take up more space than necessary and require either plenty of physical input or electrical power.

The present invention serves to minimize the physical input and accommodate a wide variety of pipes and cables. The present invention requires limited space and does not require an extensive skill set to operate. The present invention utilizes rotary force to push a cable through a pipe. The present invention accommodates cables of varying widths and secures pipes of varying sizes. The present invention features enhanced safety guards that protect a user in the event a cable snaps or current runs through the cable.

DETAILED DESCRIPTION OF THE INVENTION

All illustrations of the drawings are for the purpose of describing selected versions of the present invention and are not intended to limit the scope of the present invention.

Figure 1:
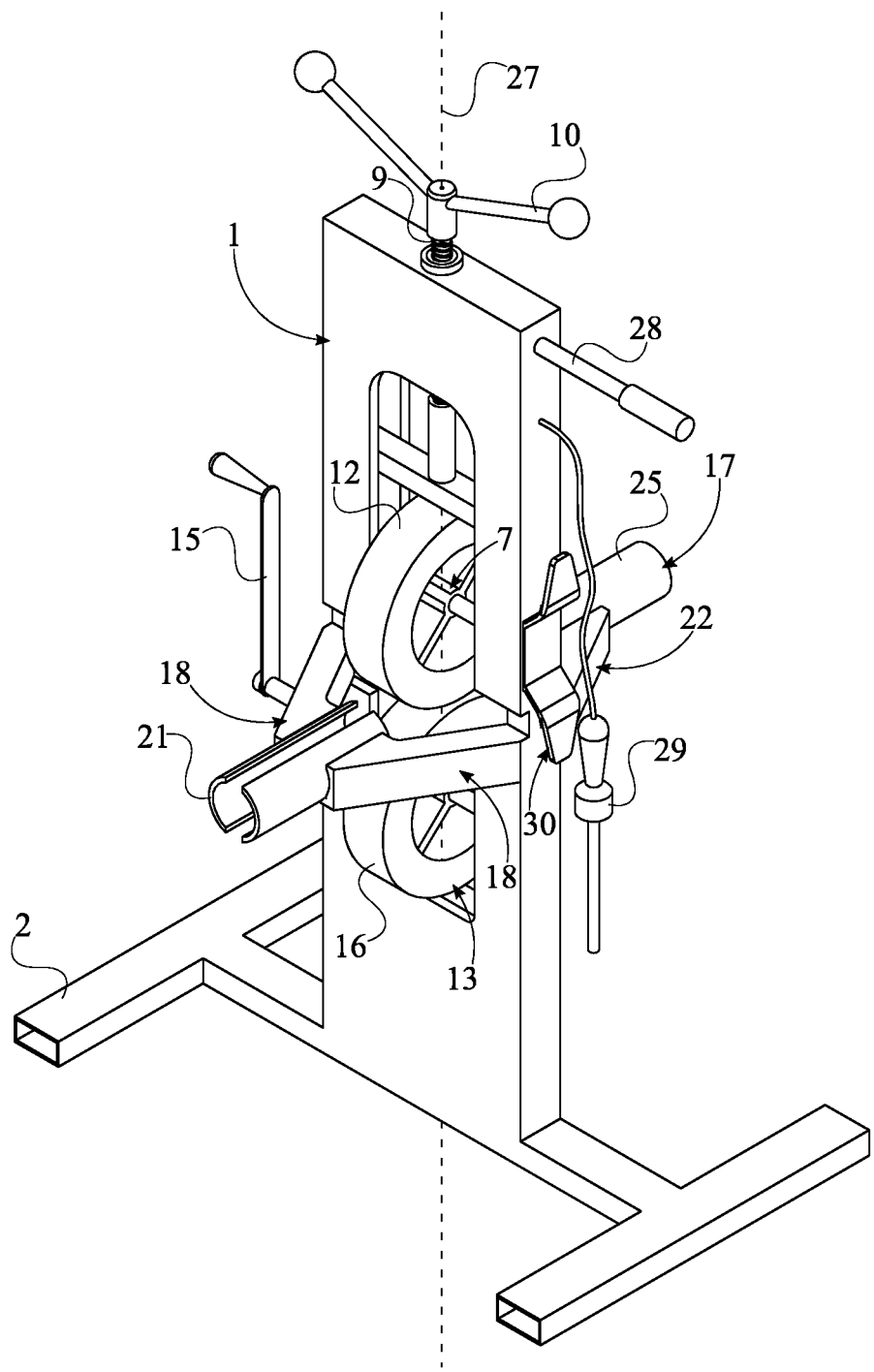
FIG. 1 is a perspective view of the present invention.

The present invention is a cable pushing device that correctly aligns a cable and a pipe with one another in order to push the cable through the pipe, while minimizing the manual labor of a user. The present invention mounts both the cable and the pipe so that the cable effectively traverses through the cable freely. In order to efficiently push a cable through a pipe, the present invention comprises a frame 1, a first wheel assembly 7, a second wheel assembly 13, and a cable guide system 17, as illustrated in FIG. 1. The frame 1 upholds and positions the first wheel assembly 7, the second wheel assembly 13, and the cable guide assembly. The frame 1 stabilizes the first wheel assembly 7 and the second wheel assembly 13 so that the cable freely traverses into the pipe. More specifically, the frame 1 comprises a base 2, a first arm 3, a second arm 4, and a platform 5. The base 2 stabilizes the first arm 3 and the second arm 4. The first arm 3 and the second arm 4 positions and aligns the first wheel assembly 7 and the second wheel assembly 13 with one another. The first arm 3 and the second arm 4 also guides the first wheel assembly 7 as the first wheel assembly 7 move up and down along the frame 1, thereby accommodating a variety of cables and pipes. The platform 5 upholds the first wheel assembly 7 above the second wheel assembly 13. The first wheel assembly 7 and the second wheel assembly 13 press upon the cable and push the cable in unison into the pipe. In the event the cable pushes against the interior surfaces of the pipe, the first wheel assembly 7 and the second wheel assembly 13 apply the necessary for against the pipe to overcome any friction. However, the first wheel assembly 7 and the second wheel assembly 13 does in fact minimizes the effort required by the user to push the cable into the pipe by utilizing rotary force. The cable guide system 17 upholds and positions both the pipe and the cable between the first wheel assembly 7 and the second wheel assembly 13. The cable guide system 17 prevents a user from having to both push the cable and uphold the cable and the pipe.

Figure 5:
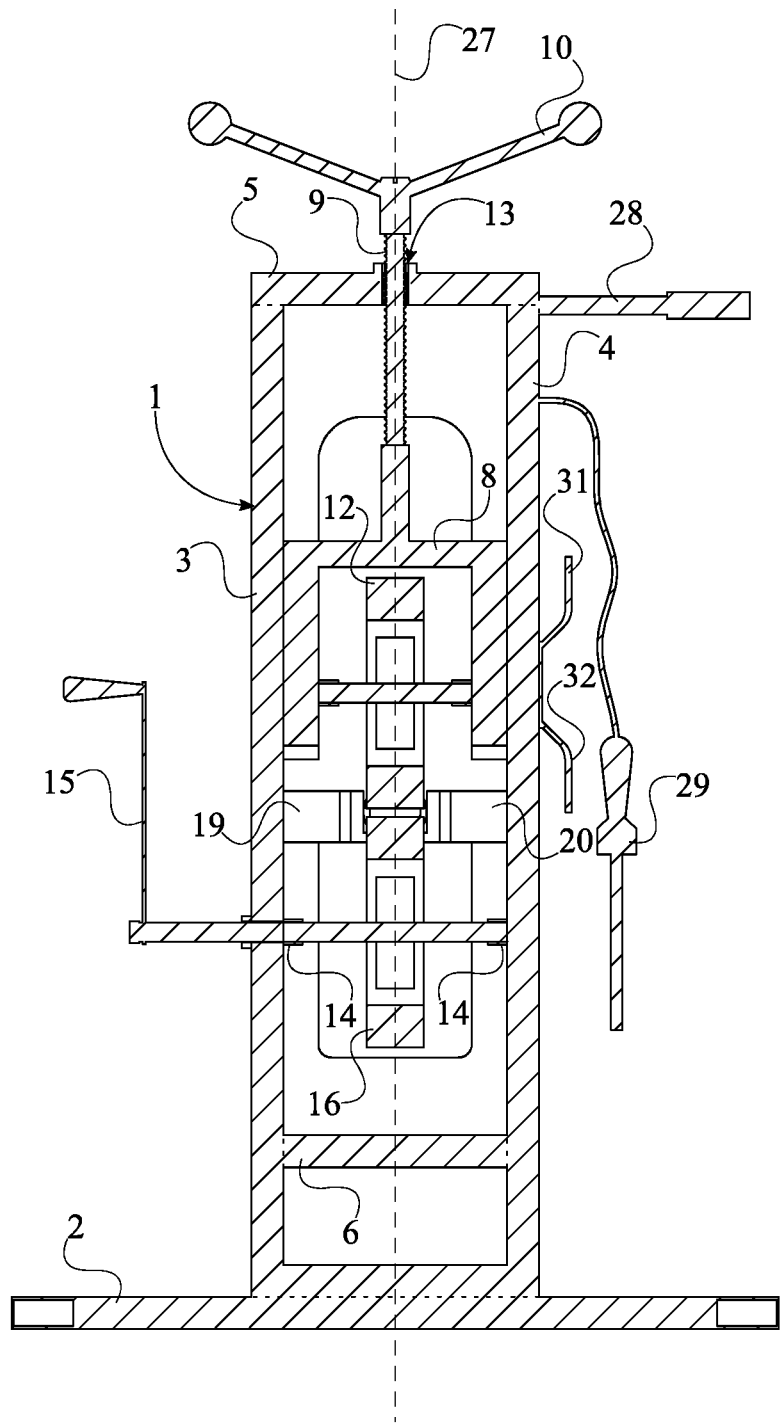
FIG. 5 is a cross-section of FIG. 4 along line 5-5 of the present invention.

The overall configuration of the aforementioned components allows a variety cables to traverse into a pipe with minimal physical effort. As seen in FIG. 5, the first arm 3 and the second arm 4 are mounted onto the base 2 and are positioned offset from each other across the base 2, securing and positioning the first wheel assembly 7 and the second wheel assembly 13. More specifically, the first arm 3 and the second arm 4 are oriented parallel to each other. The platform 5 is mounted in between the first arm 3 and the second arm 4 and is positioned opposite the base 2 across the first arm 3 and the second arm 4. This arrangement stabilizes the first arm 3 and second arm 4 to one another, accounting for the linear movement of the first wheel assembly 7 across both the first arm 3 and the second arm 4. The second wheel assembly 13 is mounted in between the first arm 3 and the second arm 4, adjacent to the base 2, thereby upholding the cable as the cable traverses into the pipe. The rotational force of the second wheel assembly 13 against the cable is reinforced by the first wheel assembly 7 as the first wheel assembly 7 is slidably mounted in between the first arm 3 and the second arm 4. The first wheel assembly 7 is preferably positioned in between the second wheel assembly 13 and the platform 5, as seen in FIG. 1, in order to facilitate the access to the first wheel assembly 7 by the user. In order to minimize the physical input of the user, the first wheel assembly 7 and the second wheel assembly 13 is aligned with each other along a vertical axis 27 of the frame 1. The vertical axis 27 of the frame 1 is positioned parallel and in between the first arm 3 and the second arm 4, reinforcing the structure of the frame 1. The cable guide system 17 is fixed to the first arm 3 and the second arm 4 and is positioned in between the first wheel assembly 7 and the second wheel assembly 13, defining and simplifying the path of the cable into the pipe.

The frame 1 further comprises at least one stabilizing bar 6, also seen in FIG. 5. The at least one stabilizing bar 6 reinforces the arrangement between the first arm 3 and the second arm 4. The at least one stabilizing bar 6 is fixed between the first wheel assembly 7 and the base 2 as to not interfere with the path of the first wheel assembly 7 along the first arm 3 and the second arm 4. In the preferred embodiment of the present invention, the at least one stabilizing bar 6 is concealed within a cover that surrounds the first arm 3, the second arm 4, and the platform 5. In alternate embodiment of the present invention, the at least one stabilizing bar 6 may be visible from the exterior of the present invention.

In order for the first wheel assembly 7 to traverse across the first arm 3 and the second arm 4, the first wheel assembly 7 comprises a clevis 8, a male-threaded shaft 9, a handlebar 10, a female-threaded slot 11, and a first wheel 12, as illustrated in FIG. 5. The clevis 8 mounts the first wheel 12 between the first arm 3 and the second arm 4. The male-threaded shaft 9 suspends the clevis 8 between the first arm 3 and the second arm 4. The handlebar 10 allows the user to adjust the position of the clevis 8 along the first arm 3 and the second arm 4. The female-threaded slot 11 prevents the male-threaded shaft 9 from slipping past the platform 5. Consequently, the engagement between the male-threaded shaft 9 and the female-threaded slot 11 fixes the desired position of the clevis 8 along the first arm 3 and the second arm 4. The first wheel 12 applies pressure against the pipe and reinforces the rotary force of the second wheel assembly 13 against the pipe. The clevis 8 is slidably mounted in between the first arm 3 and the second arm 4, accommodating various sized cables. The female-threaded slot 11 traverses through the platform 5 and is oriented normal to the platform 5. This arrangement accommodates the arrangement of the first arm 3 and the second arm 4 and facilitates the sliding of the clevis 8 along the first arm 3 and the second arm 4. The male-threaded shaft 9 is engaged through the female-threaded slot 11, allowing a user to maximize the force of the first wheel 12 against the pipe that is resting on the second wheel assembly 13. The clevis 8 is terminally fixed to the shaft, and the handle is terminally and torsionally fixed to the shaft, opposite the clevis 8. This arrangement facilitates the access of the user to the handle and allows the first wheel assembly 7 to freely engage with the second wheel assembly 13 and the cable. The user twists the handlebar 10 in a given direction to loosen the force of the first wheel 12 against the second wheel assembly 13 and twists the handlebar 10 in the opposite direction to increase the force or tighten the first wheel 12 against the second wheel assembly 13. The handlebar 10 and male-threaded shaft 9 are shown in a retracted configuration with respect to the female-threaded slot 11 in FIG. 2 and in an extended configuration with FIG. 3, respectively showing the tightening and loosening of the first wheel assembly 7 against second wheel assembly 13.

In order for the second wheel assembly 13 to directly apply rotary force against the cable, the second wheel 16 comprises a pair of axle brackets 14, a crank 15, and a second wheel 16, also seen in FIG. 5. The pair of axle brackets 14 positions the second wheel 16 along the first arm 3 and the second arm 4 via an axle, while allowing the second wheel 16 to rotate freely. The crank 15 allows a user to control the rotation and force of the second wheel 16 against the cable and, consequently, the first wheel 12 of the first wheel assembly 7. The second wheel 16 directs and pushes the cable into the pipe. The second wheel 16 is rotatably connected between the pair of axle brackets 14 so that the second wheel 16 applies constant force against the cable as the user rotates the crank 15. The crank 15 is positioned external to the frame 1 and is torsionally connected to the second wheel 16 allowing the user to easily access the crank 15 and preventing the rotation of the crank 15 from being inhibited.

Figure 4:
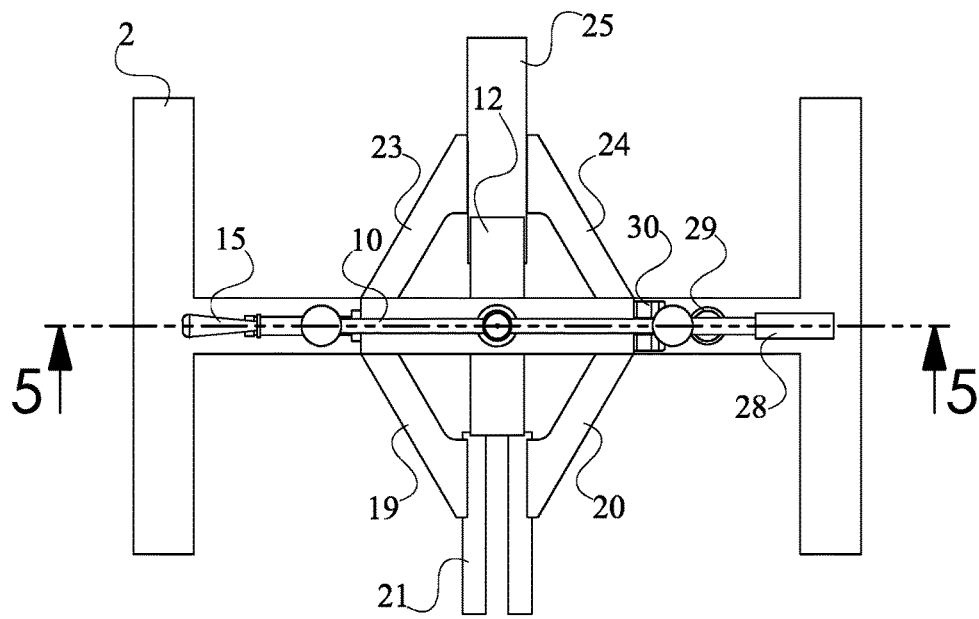
FIG. 4 is a top side view of the present invention.
Figure 6:
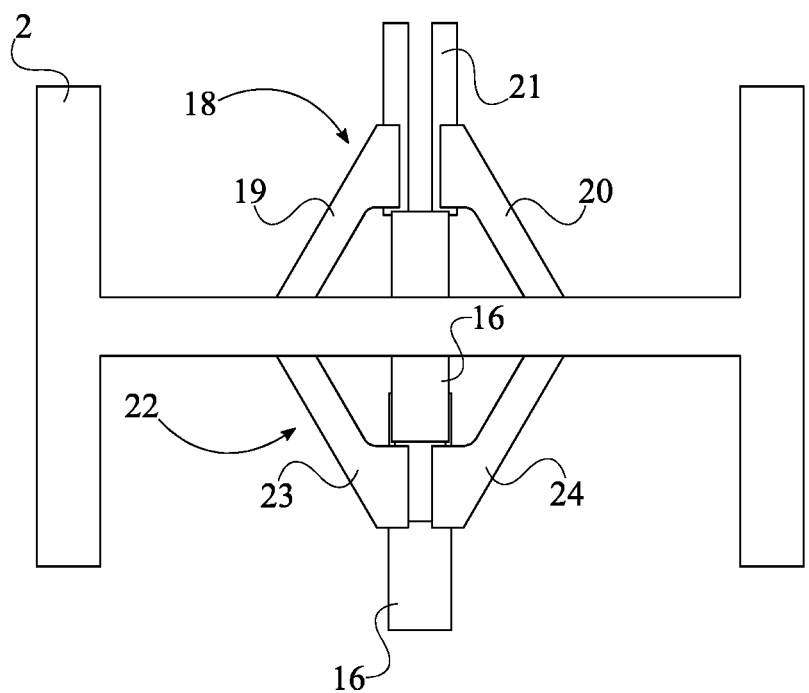
FIG. 6 is a bottom side view of the present invention.
Figure 7:
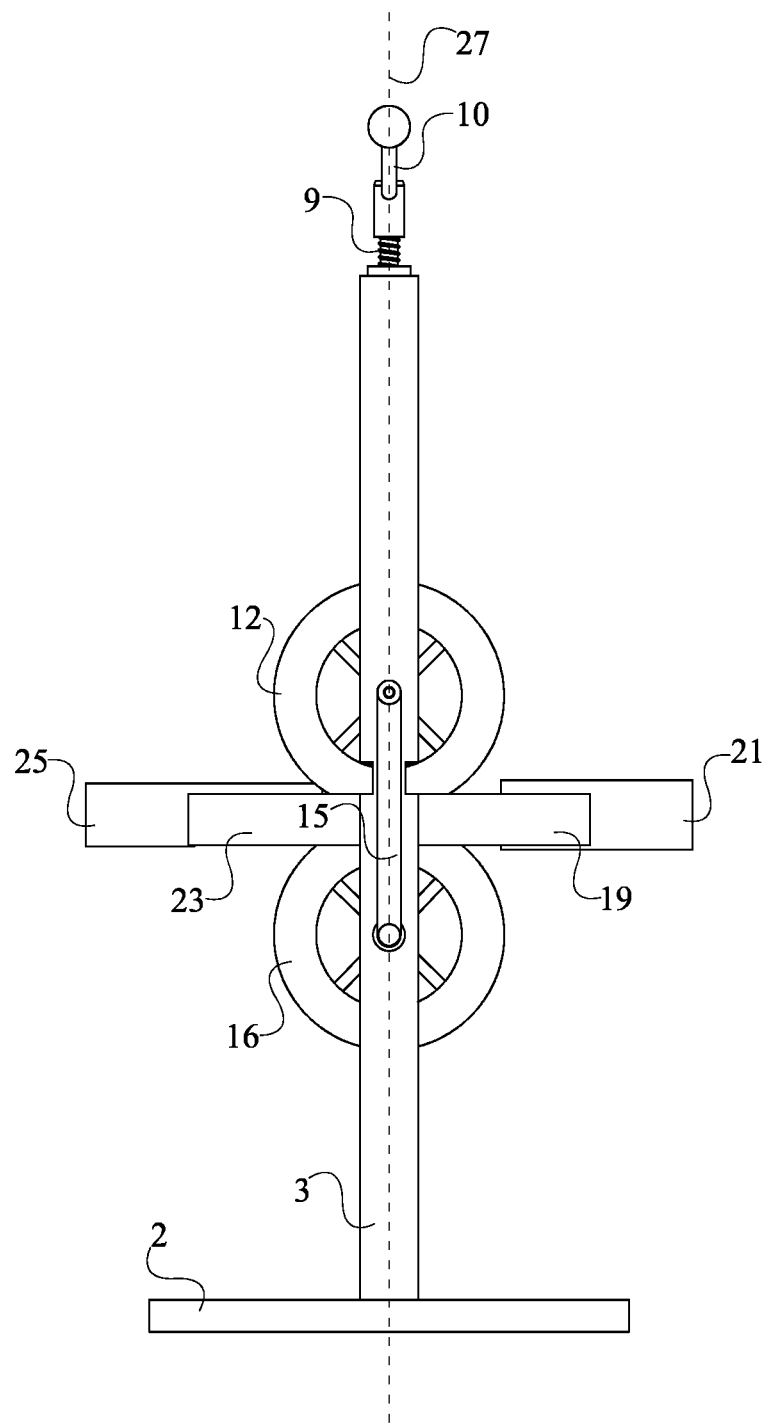
FIG. 7 is a left side view of the present invention.

The pipe and cable are supported and positioned between the first wheel assembly 7 and the second wheel assembly 13 as the cable guide system 17 comprises a pair of sleeve support bars 18, a pipe-mounting sleeve 21, a pair of tube support bars 22, and a cable-mounting tube 25. This arrangement is seen in FIG. 4, FIG. 6, and and FIG. 7. The pair of sleeve support bars 18 upholds and stabilizes the pipe-mounting sleeve 21. The pipe-mounting sleeve 21 positions the pipe between the first wheel assembly 7 and the second wheel assembly 13 so that the pipe may readily receive the cable. In the preferred embodiment of the pipe-mounting sleeve 21, the pipe-mounting sleeve 21 comprises a slot that traverses through the pipe-mounting sleeve 21 and is oriented parallel to the vertical axis 27 of the frame 1, as illustrated in FIG. 4 and FIG. 6. This slot allows the pipe-mounting sleeve 21 to better accommodate and effectively secure a pipe onto the present invention. Similarly, the pair of tube support bars 22 upholds and stabilizes the cable-mounting tube 25. The cable-mounting tube 25 positions the cable so that the cable may easily traverse into the pipe. In the preferred embodiment of the present invention, the cable-mounting tube 25 comprises a tongue that is terminally fixed to the cable-mounting tube 25 and is positioned adjacent the frame 1. More specifically, the tongue is positioned opposite the base 2, in order to protect the user from the cable if the cable breaks as the cable traverses into the pipe.

The configuration of the aforementioned components of the cable guide system 17 facilitates the pushing of the cable into the pipe as the pair of sleeve support bars 18 and the pair of tube support bars 22 are positioned opposite each other about the frame 1 as the cable terminally enters the pipe, shown in FIG. 4 and FIG. 6. The pipe-mounting sleeve 21 is connected adjacent to the pair of sleeve support bars 18, opposite the frame 1, so that the pipe-mounting sleeve 21 does not interfere with the engagement of the first wheel assembly 7 and the second wheel assembly 13. Similarly, the cable-mounting tube 25 is connected adjacent to the pair of tube support bars 22, opposite the frame 1, so the cable-mounting tube 25 does not interfere with the engagement of the first wheel assembly 7 and the second wheel assembly 13. More specifically, the cable-mounting tube 25 is positioned concentric with the pipe-mounting sleeve 21, and the pipe-mounting sleeve 21 and the cable-mounting tube 25 are oriented perpendicular to the vertical axis 27 of the frame 1. This arrangement maximizes the rotary force applied to the cable via the first wheel 12 and the second wheel 16 of the first wheel assembly 7 and the second wheel assembly 13, respectively.

Figure 8:
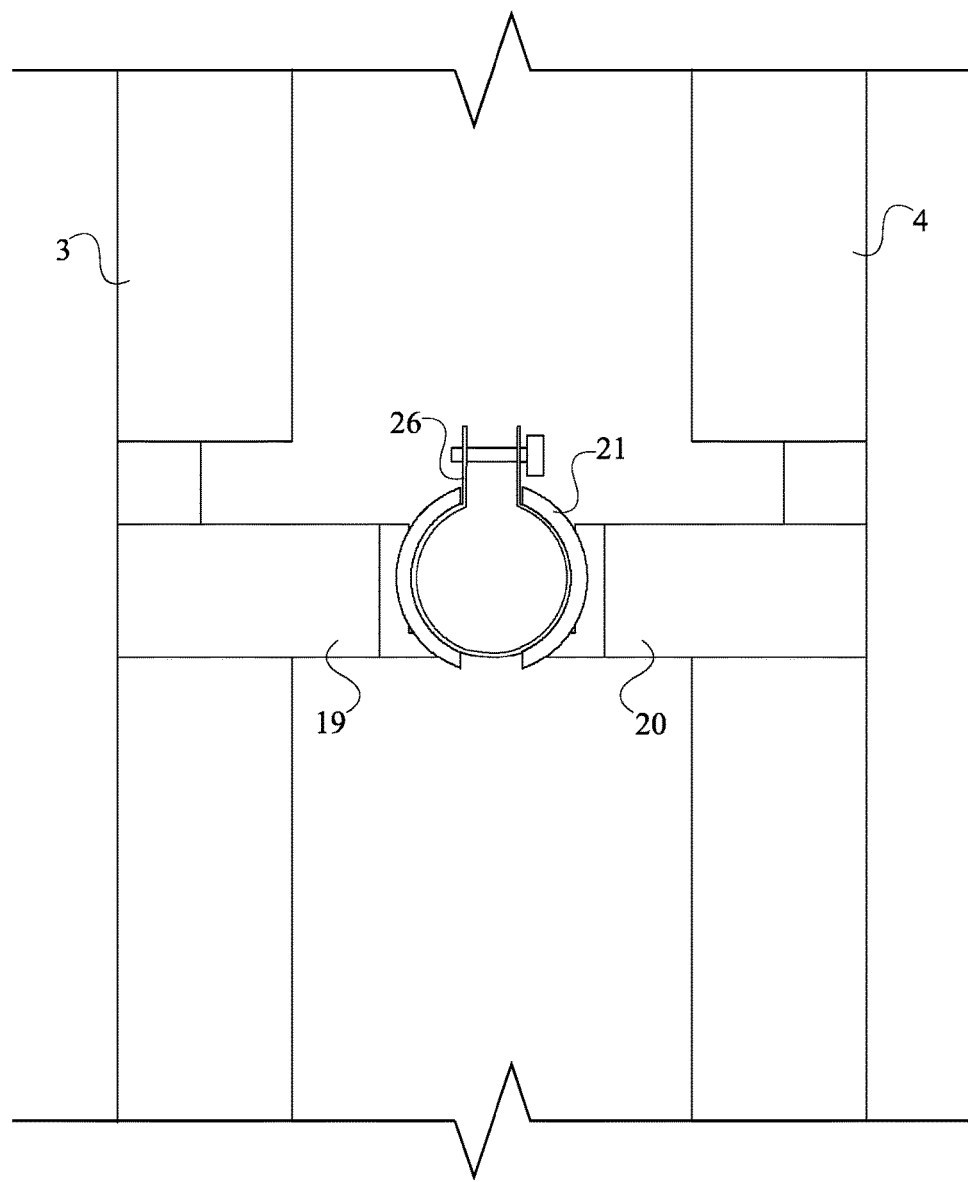
FIG. 8 is an exploded view of the pipe-mounting sleeve and the at least one pipe fastener present invention

The cable guide system 17 further comprises at least one pipe fastener 26, illustrated in FIG. 8, in order to accommodate and secure a variety of pipes to the present invention. The pair of sleeve support bars 18 further stabilizes the pipe as the cable traverses into the pipe as the pair of sleeve support bars 18 comprises a first suspending bar 19 and a second suspending bar 20, seen in FIG. 4 and FIG. 6. The first suspending bar 19 is fixed between the first arm 3 and the pipe-mounting sleeve 21. Similarly, the second suspending bar 20 is fixed between the second arm 4 and the pipe-mounting sleeve 21. This arrangement connects the pipe-mounting sleeve 21 to both the first arm 3 and the second arm 4, as well as effectively suspends the pipe-mounting sleeve 21 beside the frame 1. More specifically, the first suspending bar 19 and the second suspending bar 20 are oriented at an acute angle with each other. The position of the pipe is even more secure to the pipe-mounting sleeve 21 as the at least one pipe fastener 26 is integrated into the pipe-mounting sleeve 21 and is positioned opposite to the first suspending bar 19 and the second suspending bar 20. In the preferred embodiment of the present invention, the at least one pipe fastener 26 is a metal clamp, however, it is understood that a variety of fasteners may integrated into the pipe-mounting sleeve 21 in order to effectively secure pipe.

The pair of tube support bars 22 further stabilizes the cable as the pair of tube support bars 22 comprises a third suspending bar 23 and a fourth suspending bar 24, also seen in FIG. 4 and FIG. 6. Similar to the pair of sleeve support bars 18, the third suspending bar 23 is fixed between the first arm 3 and the cable-mounting tube 25. Likewise, fourth suspending bar 24 is fixed between the second arm 4 and the cable-mounting tube 25. This arrangement connects the cable-mounting tube 25 to both the first arm 3 and the second arm 4 as well as effectively suspends the cable-mounting tube 25 beside the frame 1. Consequently, the path and direction of the pipe is clearly defined. More specifically, the third suspending bar 23 and the fourth suspending bar 24 are oriented at an acute angle with each other.

The preferred embodiment of the present invention includes a variety of accessories that facilitate the cable-pushing process and protect the user as the cable is pushed through the pipe. The preferred embodiment of the present invention further comprises a stabilizing handle 28, illustrated in FIG. 1, FIG. 2, FIG. 3, and FIG. 5. The stabilizing handle 28 allows a user to mount himself or herself onto the frame 1 of the present invention as the user rotates the crank 15. This allows the user to apply more force as the user rotates the crank 15. The cable may come into contact with the interior surfaces of the pipe, and the user may need to overcome the friction between the cable and the pipe with more force. The stabilizing handle 28 is mounted external to the frame 1, preferably above the crank 15. The preferred embodiment of the present invention further comprises a ground rod 29, also seen in in FIG. 1, FIG. 2, FIG. 3, and FIG. 5. The ground rod 29 directs any current that may come from the cable away from the user and into the ground. The ground rod 29 is electrically connected to the frame 1 and is preferably mounted on the second arm 4 of the frame 1.

Figure 2:
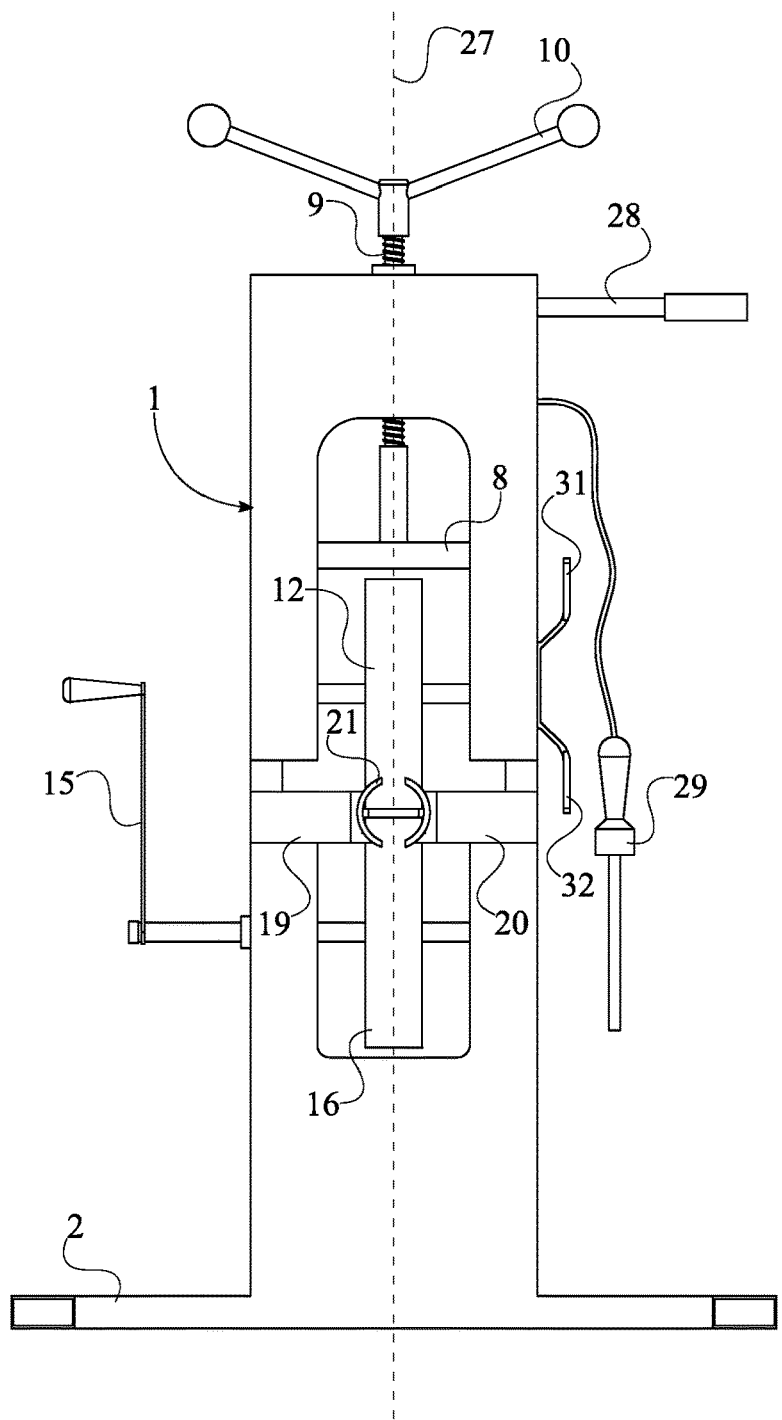
FIG. 2 is a front side view of the present invention, where the male-threaded shaft is retracted within the female-threaded slot.
Figure 3:
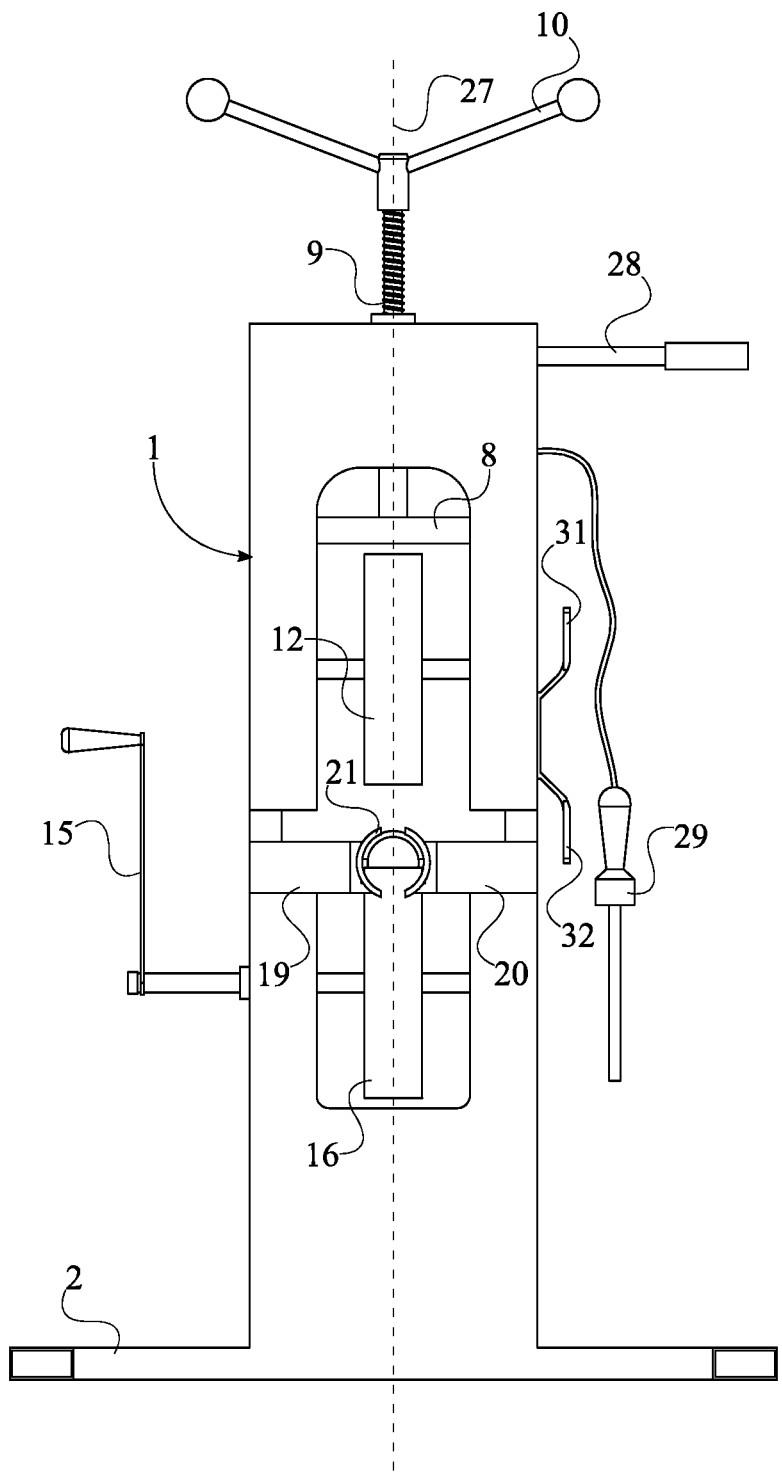
FIG. 3 is a front side view of the present invention, where the male-threaded shaft is extended from within the female-threaded slot.
Figure 9:
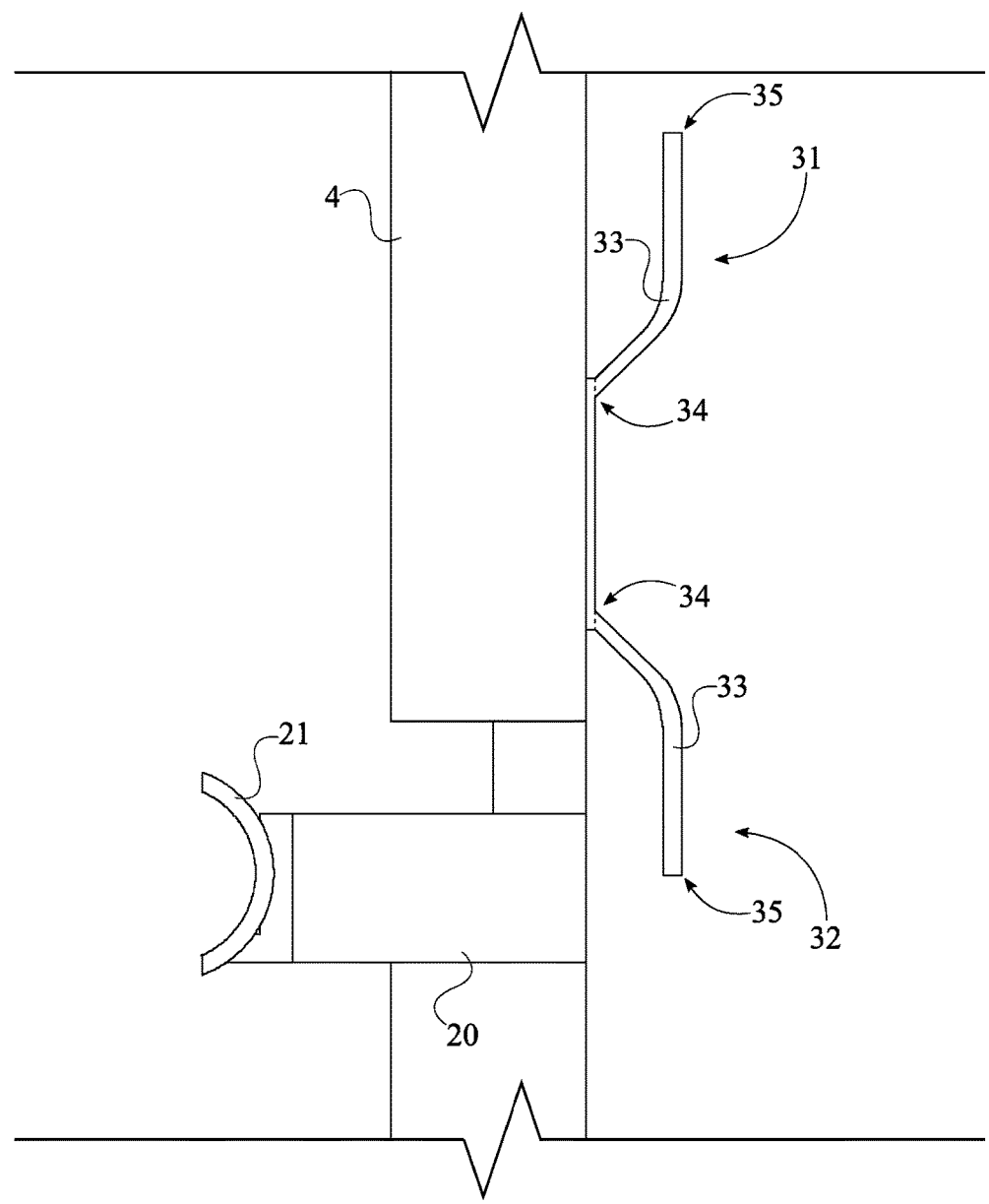
FIG. 9 is an exploded view of the cable holder of the present invention.

The preferred embodiment of the present invention further comprises a cable holder 30, clearly seen in FIG. 1, FIG. 2, and FIG. 9. The cable holder 30 provides additional storage for any extra cable that is not being pushed into the pipe. The cable holder 30 may also prevent excess length of elongated cables from becoming tangled as the cable is pushed into the pipe. The cable holder 30 is mounted onto the second arm 4 and is positioned external to the frame 1, similar to that of the ground rod 29. More specifically, the cable holder 30 comprises a first hook 31 and a second hook 32. The first hook 31 and the second hook 32 allows the cable to wrap around the cable holder 30. The first hook 31 and the second hook 32 each comprises an angled body 33, a proximal end 34, and a distal end 35. The first hook 31 and the second hook 32 are positioned offset from each other along the second arm 4. The proximal end 34 and the distal end 35 are positioned opposite each other across the angled body 33. The proximal end 34 is fixed to the second arm 4, and the distal end 35 is positioned offset from the second arm 4. The proximal end 34 of the first hook 31 is positioned adjacent the proximal end 34 of the second hook 32. The distal end 35 of the first hook 31 is oriented away from the distal end 35 of the second hook 32. This configuration upholds the cable and limits any tangling of the cable.

Although the invention has been explained in relation to its preferred embodiment, it is to be understood that many other possible modifications and variations can be made without departing from the spirit and scope of the invention as hereinafter claimed.

What is claimed is:

1. A cable pushing device comprises:
   a frame;
   a first wheel assembly;
   a second wheel assembly;
   a cable guide system;
   the frame comprises a base, a first arm, a second arm, and a platform;
   the first arm and the second arm being mounted onto the base;
   the first arm and the second arm being positioned offset from each other across the base;
   the first arm and the second arm being oriented parallel to each other;
   the platform being mounted between the first arm and the second arm;
   the platform being positioned opposite the base across the first arm and the second arm;
   the second wheel assembly being mounted between the first arm and the second arm, adjacent to the base;
   the first wheel assembly being slidably mounted in between the first arm and the second arm;
   the first wheel assembly being positioned between the second wheel assembly and the platform;
   the first wheel assembly and the second wheel assembly being aligned with each other along a vertical axis of the frame;
   the vertical axis of the frame being positioned parallel and in between the first arm and the second arm;
   the cable guide system being fixed to the first arm and the second arm; and,
   the cable guide system being positioned between the first wheel assembly and the second wheel assembly.

2. The cable pushing device as claimed in claim 1 comprises:
   the frame comprises at least one stabilizing bar; and,
   the at least one stabilizing bar being fixed between the first wheel assembly and the base.

3. The cable pushing device as claimed in claim 1 comprises:
   the first wheel assembly comprises a clevis, a male-threaded shaft, a handlebar, a female-threaded slot, and a first wheel;
   the clevis being slidably mounted in between the first arm and the second arm;
   the first wheel being rotatably mounted into the clevis;
   the female-threaded slot traversing through the platform;
   the female-threaded slot being oriented normal to the platform;
   the male-threaded shaft being engaged through the female-threaded hole;
   the clevis being terminally fixed to the male-threaded shaft; and,
   the handle being terminally and torsionally fixed to the shaft, opposite the clevis.

4. The cable pushing device as claimed in claim 1 comprises:
   the second wheel assembly comprises a pair of axle brackets, a crank, and a second wheel;
   the second wheel being rotatably connected between the pair of axle brackets;
   the crank positioned external to the frame; and,
   the crank being torsionally connected to the second wheel.

5. The cable pushing device as claimed in claim 1 comprises:
   the cable guide system comprises a pair of sleeve support bars, a pipe-mounting sleeve, a pair of tube support bars, and a cable-mounting tube;

the pair of sleeve support bars and the pair of tube support bars being positioned opposite each other about the frame;

the pipe-mounting sleeve being connected adjacent to the pair of sleeve support bars, opposite the frame;

the cable-mounting tube being connected adjacent to the pair of tube support bars, opposite the frame;

the cable-mounting tube being positioned concentric with the pipe-mounting sleeve; and, the pipe-mounting sleeve and the cable-mounting tube being oriented perpendicular to the vertical axis of the frame.

6. The cable pushing device as claimed in claim 5 comprises:

the cable guide system comprises at least one pipe fastener;

the pair of sleeve support bars comprises a first suspending bar and a second suspending bar;

the first suspending bar being fixed between the first arm and the pipe-mounting sleeve;

the second suspending bar being fixed between the second arm and the pipe-mounting sleeve;

the first suspending bar and the second suspending bar being oriented at an acute angle with each other;

the at least one pipe fastener being integrated into the pipe-mounting sleeve; and, the at least one pipe fastener being positioned opposite the first suspending arm and the second suspending arm.

7. The cable pushing device as claimed in claim 5 comprises:

the pair of tube support bars comprises a third suspending bar and a fourth suspending bar;

the third suspending bar being fixed between the first arm and the cable-mounting tube;

the fourth suspending bar being fixed between the second arm and the cable-mounting tube; and, the third suspending bar and the fourth suspending bar being oriented at an acute angle with each other.

8. The cable pushing device as claimed in claim 1 comprises:

a stabilizing handle; and, the stabilizing handle being mounted external to the frame.

9. The cable pushing device as claimed in claim 1 comprises:

a ground rod; and, the ground rod being electrically connected to the frame.

10. The cable pushing device as claimed in claim 1 comprises:

a cable holder;

the cable holder being mounted onto the second arm; and, the cable holder being positioned external to the frame.

11. The cable pushing device as claimed in claim 10 comprises:

the cable holder comprises a first hook and a second hook;

the first hook and the second hook each comprises an angled body, a proximal end, and a distal end;

the first hook and the second hook being positioned offset each other along the second arm;

the proximal end and the distal end being positioned opposite each other across the angled body;

the proximal end being fixed to the second arm;

the distal end being positioned offset from the second arm;

the proximal end of the first hook being positioned adjacent the proximal end of the second hook; and, the distal end of the first hook being oriented away from the distal end of the second hook.

\* \* \* \* \*